Patented Mar. 6, 1951

2,543,846

UNITED STATES PATENT OFFICE 2,543,846

QUICK-OPERATING PRESSURE RELIEF VALVE

Donald G. Griswold, Alhambra, Calif., assignor to Clayton Manufacturing Company, Alhambra, Calif., a corporation of California Application February 29, 1944, Serial No. 524,451

18 Claims. (Cl. 137—53)

The present invention relates to quick operating valves, and more particularly to quick-operating, automatic pressure relief valves.

More specifically, the invention relates to an automatic relief valve which will open quickly to its full extent, if necessary, to take care of excess pressure or sudden surges in a pipe line and close at a relatively slower, governed rate to prevent line shock, chatter, and slamming of the valve against its seat as the valve closes.

The invention further relates to an automatic pressure relief valve which will not only open quickly to take care of excess pressure or sudden surges, but which will also partially close quickly after the excess pressure or surge has been relieved to avoid an excessive or undesirable pressure drop in the line, and which will complete its closing movement at a much slower, controlled rate to prevent line shock, chatter, and slamming.

In many systems or pipelines handling water or other liquid, it is necessary to employ a relief valve that will open quickly in order to relieve surges or excess pressure to avoid damage, and at the same time it is usually undesirable to have the valve close quickly throughout its closing movement because of the resulting line shock, valve chatter and other noises which would result therefrom. Accordingly, and where temporary loss of line pressure is not an important factor, a valve control means embodying the principles of the present invention may be used to effect quick opening of the relief valve and closing of said relief valve at a slower rate throughout its closing movement to avoid the objections noted. In other systems or lines where a temporary pressure drop in the line is undesirable, a valve control means constructed in accordance with the further principles of the present invention may be used and which will cause the relief valve to open quickly to relieve any sudden surges or excess pressure, partially close quickly to prevent undesirable loss of pressure in the line or system, and complete its closing movement at a much slower and governed rate of speed to avoid line shock and noise.

Certain prior diaphragm type relief valves associated with an automatic pressure-responsive pilot valve as a means for controlling the supply and exhaust of operating fluid to the diaphragm chamber thereof, operate to effect a somewhat rapid opening of the relief valve and are highly satisfactory for certain installations, but do not open anywhere near quickly enough to take care of the sudden surges encountered in other installations to provide the quick relief necessary for safe and satisfactory operation of said other installations. The speed of operation or action of such prior valves has been limited by the capacity of the exhaust port or ports of the pilot valve, which ports determine the rate of exhaust or discharge of spent operating fluid from the diaphragm chamber of the relief valve and, therefore, limit its speed of opening. Even when multiple exhaust ports have been used in the pilot valve the total exhaust rate is such that the opening of the relief valve does not occur quickly enough to meet the excessively high demands of, for example, certain water handling systems.

The difficulties presented by pilot-controlled diaphragm valves of the type referred to hereinabove are overcome by the present invention through the provision of a control means comprising a pilot-controlled, pressure-responsive auxiliary exhaust control valve having a much larger capacity than could possibly be provided by the ports of the pilot valve, arranged to exclusively control the exhaust of spent operating fluid from the diaphragm pressure chamber of the main or relief valve.

In one form of fluid pressure operable main or relief valve and control means, a pilot valve is associated with the main valve and includes a pressure responsive device for actuating a pilot disc for effecting the opening and closing of the main valve in accordance with pressure variations on the intake side of said main valve, the ports in the pilot disc being arranged so that the pilot valve exclusively admits operating fluid under pressure into the pressure chamber of the main valve to effect closing of said main valve, and also controls the admission and exhaust of operating fluid to and from the auxiliary exhaust control valve which valve, as pointed out above, exclusively effects the exhaust of spent operating fluid from the pressure chamber of the main valve.

As an illustration of an operative installation and not by way of limitation, a ⅜ inch auxiliary exhaust control valve may be connected in communication with the diaphragm pressure chamber of a 4 inch main diaphragm valve for effecting a quick draining or exhaust of spent operating fluid from the pressure chamber of said main diaphragm valve, while a small pilot valve provided with a pilot disc having ports $\tfrac{1}{16}$ inch in diameter and actuated by a pressure-responsive device may be associated with both said valves so as to automatically control the operation thereof. The pressure-responsive device, which actuates the pilot valve, is arranged so that when a surge or excess pressure condition occurs in the pipeline, the pilot disc will be rotated to effect opening of the auxiliary exhaust control valve and thus quickly drain operating fluid from the diaphragm pressure chamber of the main valve and permit said main valve to open quickly. After the surge or excess pressure has been relieved, the position of the pilot valve disc will be automatically shifted to effect closing of the auxiliary exhaust control valve and at the same time the pilot disc will permit the flow of operating fluid under pressure at a slow rate into the diaphragm pressure chamber of the main valve to effect closing of asid main valve at a predetermined controlled rate.

It will be obvious that the ⅜ inch auxiliary exhaust control valve necessarily has a capacity for draining the spent operating fluid from the diaphragm chamber of the main valve at a much higher rate than could possibly be done even if a plurality of 1/16 inch ports were used in the pilot disc. It will also be manifest that a pilot valve having a pilot disc provided with ⅜ inch ports would necessarily be large and cumbersome and much more expensive itself than a small pilot and a ⅜ inch diaphragm valve. By having the pilot valve arranged so that a port thereof exclusively controls the admission of operating fluid directly to the main diaphragm chamber, the main valve is necessarily caused to close at a fairly slow uniform, controlled rate throughout its closing movement. If further regulation of the closing rate is required, an adjustable needle valve may be connected in the conduit leading from the pilot valve to the diaphragm chamber of the main valve.

In accordance with the further principles of the present invention, the main diaphragm valve may also be controlled so that, after it has opened quickly to relieve a sudden surge or sudden increase in pressure, it may also be partially closed quickly after the surge or excess pressure has subsided so that no excessive loss of line pressure will occur, as would be the case if the valve closed at a slow rate throughout its entire closing movement, as aforedescribed. To this end, a second valve, to wit, an auxiliary inlet control valve is arranged to communicate with the diaphragm chamber of the main valve and is operatively associated with the pilot valve and the auxiliary exhaust control valve to govern the action of the main valve. With such control means, opening of the main valve is effected to relieve excess pressure by opening of the auxiliary exhaust control valve, as aforedescribed. Partial quick closing is effected by the admission of operating fluid into the main diaphragm chamber at a rapid rate through the auxiliary inlet control valve so that the main valve partially closes at a rapid rate, thereby restricting flow through the main valve to build up a back pressure in the pipeline, the further and final closing of the main valve being controlled exclusively by the flow of operating fluid under pressure through the pilot valve to effect final closing movement of the main valve at a slower, uniform, governed rate of speed.

Accordingly, the principal object of the invention is to provide an automatic, fluid pressure operable, relief valve adapted to open at a faster rate than has been possible heretofore.

Another object of the invention is to provide a pressure relief valve that will open quickly to any extent necessary to relieve a given excess pressure condition in a pipeline, even to the extent of opening fully to take the full flow capacity of said pipeline, if necessary.

Another object of the invention is to provide an automatic pressure relief valve that will open quickly to relieve an excess pressure condition in a pipeline and which will automatically close at a much slower, controlled rate of speed to prevent the valve from slamming shut and causing line shock.

A further object of the invention is to provide automatic control means for a fluid pressure operable main valve that will effect quick opening and slow closing of said main valve and which is relatively simple in construction and inexpensive to manufacture.

A still further object of the invention is to provide an automatic pressure relief valve that will open quickly to its full extent to accommodate the full flow capacity of a pipeline (if necessary), partially close quickly to avoid an undesirable pressure drop in said pipeline, and which will complete its closing movement at a much slower governed rate of speed without slamming, chattering or causing line shock.

A still further object of the invention is to provide automatic control means including a pilot valve construction adapted to be used with one or more conventional pressure fluid operable valves of small flow capacity to control the exhaust and/or supply of operating fluid to a main pressure fluid operable valve of relatively great capacity to effect the quick opening and/or quick closing of said main valve.

Other objects and features of the invention will be apparent from the following description, and drawings in which.

Figures 1, 3:
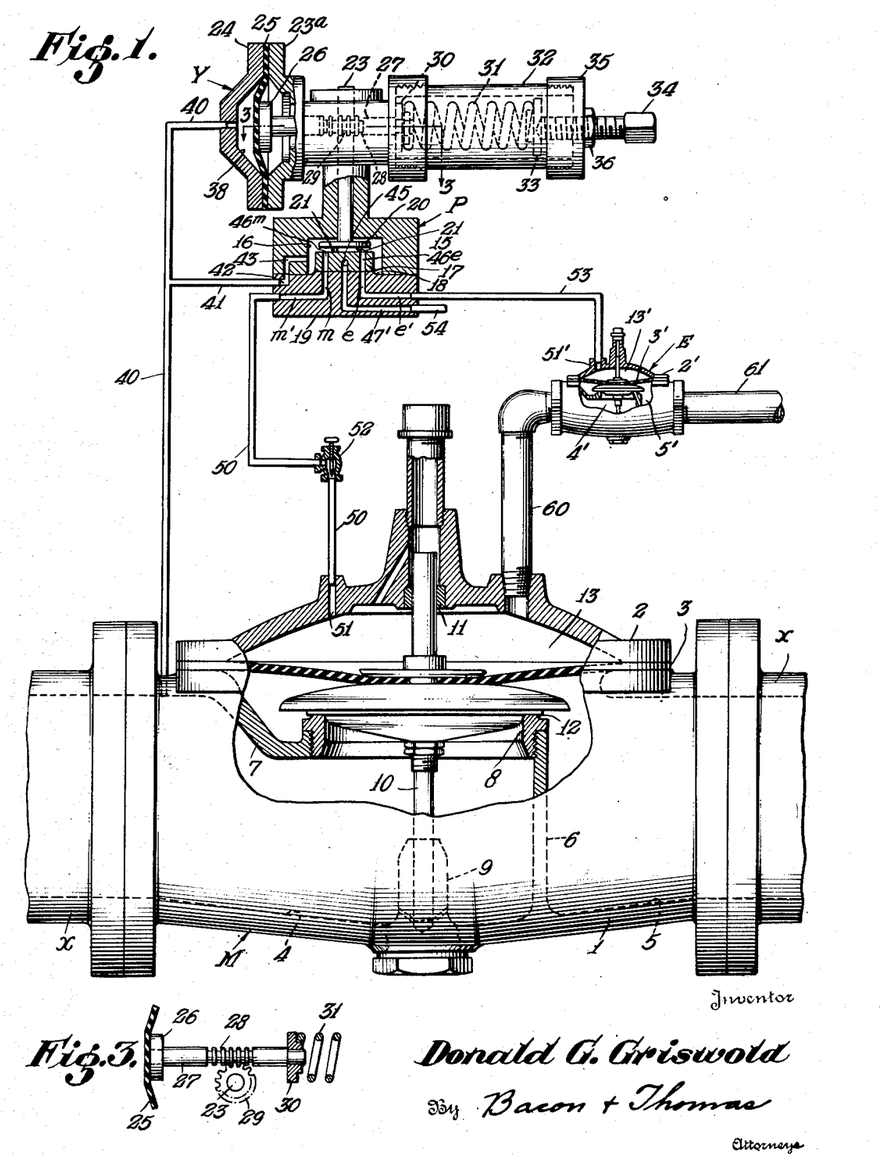
Fig. 1 diagrammatically illustrates the manner in which a quick opening and slow closing main diaphragm valve may be controlled by a pressure-responsive pilot valve mechanism (drawn to an exaggerated scale) and an auxiliary exhaust control valve, the parts of the respective valves being shown in the position they assume in normal operation when no excessive pressure exists on the intake side of the main valve and said main valve is closed.
Fig. 3 is a fragmentary sectional view taken on the line 3—3 of Fig. 1, illustrating the drive means for the pilot disc shaft.

Referring now to Fig. 1 of the drawings, the main or relief valve is generally identified by the letter M, the pilot valve by the letter P, the pressure-responsive device for actuating said pilot by the letter Y, and the auxiliary exhaust control valve by the letter E.

The main valve M comprises a body 1, a cover member 2, and a flexible diaphragm 3 disposed intermediate said body and cover. The body 1 is provided with an inlet chamber 4 and an outlet chamber 5, separated by a partition including an upright wall 6 and an inclined wall 7, merged to provide an opening to receive a valve seat 8. A hollow plug 9 is threaded into the bottom of the body 1 and forms a guide for the lower end of a valve stem 10. The upper end of the valve stem 10 is guided in a bushing 11 mounted in the cover 2. A conventional valve disc 12 is suitably clamped to the diaphragm 3 and is adapted to cooperate with the seat 8 to control the flow through the valve from the inlet chamber 4 to the outlet chamber 5. The cover 2 is dished to provide a chamber 13 between the inner surface thereof and the upper side of the diaphragm 3 adapted to receive operating fluid under pressure, effective upon said upper side of said diaphragm for controlling the flow through the main valve M.

The auxiliary exhaust control valve E may be substantially identical in construction to the main valve M and has been so illustrated in Fig. 1. Hence, a detailed description of valve E is deemed unnecessary. For convenience, the parts of the valve E generally corresponding to those of valve M are identified by similar numerals, primed.

The pilot valve P comprises a housing 15 provided with a pressure chamber 16 adapted to receive operating fluid under pressure. A pilot disc 17 is disposed in the pressure chamber 16 and engages a pilot disc seat 18 which may, if desired, be formed integral with a fluid distribution plate or base 19. The pilot disc 17 is operatively connected with a drive washer 20 by pins 21, received in recesses 22 (Fig. 5) in said drive washer, the drive washer itself being secured to one end of a pilot drive shaft 23.

The pilot 17 is adapted to be actuated in accordance with pressure variations in the inlet chamber 4 of the main valve A. To this end, the pressure-responsive device Y includes an upright flange 23ª and a cap 24 with a pilot diaphragm 25 arranged therebetween. One side of the diaphragm 25 is engaged by a plate 26 fixed to one end of a freely slidable rod 27. The rod 27 is provided with a series of annular ridges 28 intermediate its ends which are engaged with the teeth of a gear 29 mounted upon the pilot drive shaft 23 (see Fig. 3). The opposite end of the rod 29 carries a washer 30 engaged by one end of a compression spring 31 contained in a housing 32. The opposite end of the spring 31 engages a washer 33 which is freely slidable within the housing 32. A bolt 34 extends through a cap 35 on one end of the housing 32 and its inner end engages the washer 33 for varying the tension of the compression spring 31. A jam nut 36 is provided to lock the bolt 34 in any desired spring-tensioning position of adjustment relative to the cap 35. It will be apparent that movement of the rod 27 towards the right, as viewed in Fig. 1, is yieldably opposed by the compression spring 31, and that the tension of said spring may be adjusted to control the opening of the main valve M at any desired relief pressure, say 50 #/sq. in.

The cover plate 24 is provided with a cavity 38, adapted to receive fluid under pressure for effecting flexing of the pilot diaphragm 25 toward the right, as viewed in Fig. 1, with a consequent shifting of the rod 27 in the same direction and an accompanying clockwise rotation of the pilot disc 17. Fluid under pressure for effecting such flexing of the pilot diaphragm 25 is conducted from the inlet chamber 4 of the main valve through a conduit diagrammatically indicated at 40 to the chamber 38. Operating fluid is conveniently conducted to the pilot valve pressure chamber 16 in the housing 15 through a branch tube 41, one end of which is connected with the conduit 40 and its opposite end connected with a passageway 42 in the base 19, the housing 15 having a passageway 43 interconnecting the passageway 42 with the pressure chamber 16.

Figure 5:
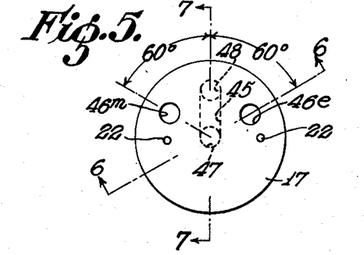
Fig. 5 is an enlarged plan view of the pilot disc.
Figure 6:
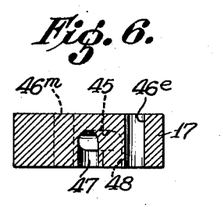
Fig. 6 is a sectional view through one of the pressure ports of the pilot disc taken on the line 6—6 of Fig. 5.
Figure 7:
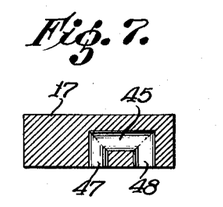
Fig. 7 is a sectional view through the exhaust port of the pilot disc taken on the line 7—7 of Fig. 5.

Referring now to Figs. 5, 6 and 7, the pilot disc 17 has a radial, generally U-shaped exhaust port 45 and through or pressure ports 46m and 46e arranged on a 60 degree radii on either side of said exhaust port. The U-shaped exhaust port 45 includes a leg portion 47 arranged on the axis of the pilot disc 17 and a second leg portion 48 arranged on a radius corresponding to that of the pressure ports 46m and 46e. The ports 45, 46m and 46e may be 1/16 inch in diameter, so that the pilot disc 17 can be quite small, say, 1/2 inch in diameter.

Figure 4:
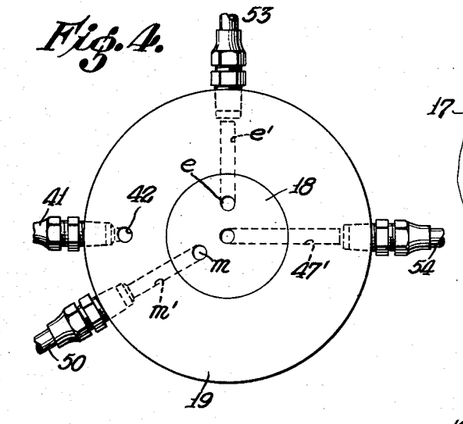
Fig. 4 is a plan view of the fluid distribution base of the pilot valve, said fluid distribution base being provided with a seat for the pilot disc.

Referring now to Fig. 4, the pilot disc seat 18 has a drain or exhaust passage 47' which includes an axial portion adapted to constantly register with the leg 47 of the U-shaped exhaust port 45. The pilot seat 18 also has ports m and e disposed upon a radius corresponding to that of the radius of the ports 46m and 46e of the pilot disc 17, whereby said ports may be brought into registration as said pilot disc is rotated.

The fluid distribution base 19 has a passageway m' communicating with the port m in the seat 18 and a passageway e' communicating with the port e in said seat. One end of a conduit 50 is connected with the passageway m' and its other end is connected with a passageway 51 (Fig. 1) in the cover 2 leading to the diaphragm pressure chamber 13. An adjustable needle valve 52 may be connected in the conduit 50 to vary the rate of flow of fluid therethrough from the chamber 16 of the pilot valve P to the diaphragm chamber 13, if desired. A second conduit 53 has one end thereof communicating with the passageway e' and its opposite end communicating with a passageway 51' in the auxiliary exhaust control valve E. A drain conduit 54 is connected with the passageway 47' for draining spent operating fluid from the diaphragm chamber 13' of the auxiliary control valve E.

The inlet chamber 4' of the auxiliary exhaust control valve E is connected with the pressure chamber 13 of the valve M by a conduit 60 and the outlet chamber 5' of the valve E is connected to a conduit 61 which may have its outlet end connected with any suitable drain.

Figure 8:
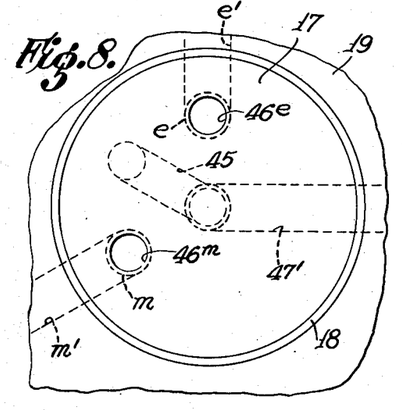
Fig. 8 is a diagrammatic plan view illustrating the relative position of the ports in the pilot disc and seat corresponding to the closed position of the main valve shown in Fig. 1.

Assuming that the relief valve M is connected in a pipe line X whose pressure is to be controlled, and further assuming that the pressure in the line X is normal, the fluid pressure in the chamber 38 of the pressure-responsive pilot valve actuating device Y will be insufficient to overcome the resistance offered by the compression spring 31 and the pilot disc 17 will then be maintained in the position diagrammatically shown in Fig. 1, the corresponding relative position of the ports in the pilot disc 17 and its cooperating seat 18 being diagrammatically shown in Fig. 8.

It will be apparent from Figs. 1 and 8 that the pressure ports 46m and 46e of the pilot disc 17 are now in registration with the ports m and e, respectively, in the pilot disc seat 18 so that fluid under pressure is effective to maintain both the main valve M and the auxiliary exhaust control valve E closed. As will be apparent from Fig. 1, fluid under pressure is effective on the upper side of the diaphragm 3 because of introduction into the main diaphragm chamber 13 through the port 46m in the pilot disc, the port m in the seat 18, passage m' in the distribution base 19, conduit 50 and passage 51 in the valve cover 2. Similarly, fluid pressure is effective on the upper side of the diaphragm 3' of the auxiliary exhaust control valve E through the port 46e in the pilot disc 17, the port e in the seat 18, the passageway e' in the fluid distribution base 19, conduit 53 and the passageway 51' in cover 2'. Thus, so long as no excess pressure exists or no sudden surge occurs in the line X which would overcome the force of the spring 31, the main valve M and the auxiliary exhaust control valve E will remain closed driptight.

Figure 2:
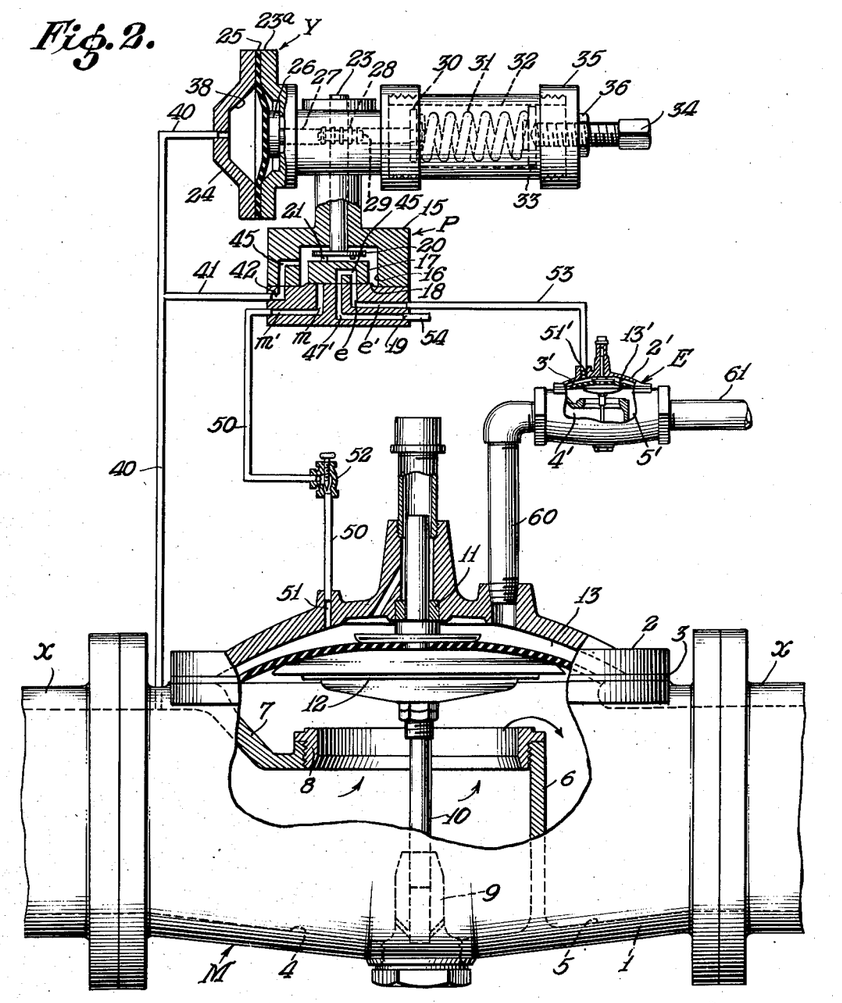
Fig. 2 is a view similar to Fig. 1, but principally showing the parts of the pilot valve and the auxiliary exhaust control valve in the position that they assume to permit quick opening of the main valve.
Figure 10:
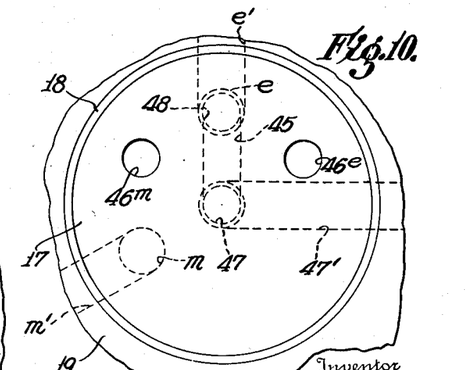
Fig. 10 is a diagrammatic view illustrating the relative position of the pilot disc with respect to its seat, corresponding to the open position of the main valve shown in Figure 2.

Assuming now that a sudden surge takes place in the pipe line X, the increase in pressure will be transmitted through the conduit 40 to the chamber 38 and flex the pilot diaphragm 25 to cause the rod 27 to be shifted to the right, as viewed in Fig. 1, to effect rotation of the pilot disc 17 through an angle depending upon the magnitude of the increase in pressure. If the increase in pressure is sufficient to effect clockwise rotation of the pilot disc 17 through an angle of about 60 degrees, said pilot disc will assume a position relative to the seat 18, as shown in Figs. 2 and 10. It will be noted that the leg 48 of the exhaust port 45 is now in registration with the port e in the seat 18 so that the operating fluid from the diaphragm chamber 13' in the auxiliary exhaust control valve E can now drain therefrom through the conduit 53, passage e' and port e in the base 19, exhaust passageway 45—47—48 in the pilot disc 17, passageway 47' in the base 19, and through drain tube 54 to permit opening of the auxiliary exhaust control valve E to exclusively effect a rapid exhaust of operating fluid from the diaphragm chamber 13 of the main valve M through the conduit 60, valve E, and conduit 61 with a consequent quick opening of said main valve to relieve the excess pressure in the pipe line X. It will also be noted from Figs. 2 and 10 that the port m in the seat 18 is obstructed by the pilot disc 17 so that no fluid under pressure can flow from the pilot pressure chamber 16 through the conduit 50 to the diaphragm pressure chamber 13 in the main valve M. This prevents undesirable bleeding of operating fluid from the pilot valve P through the chamber 13 of valve M and the auxiliary exhaust control valve E.

Figure 9:
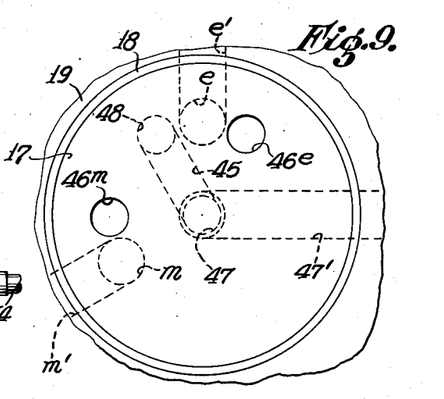
Fig. 9 is a view diagrammatically illustrating the position of the pilot disc relative to its seat when said pilot disc is in a neutral or intermediate position.

If the surge or excess pressure in the pipe line X is sufficient to only slightly compress the spring 31, the pilot disc 17 will be rotated to the neutral position indicated in Fig. 9, wherein none of the ports in said disc registers with the ports in the seat 18 and no action occurs. On the other hand, if the surge or excess pressure in the pipe line X is of such character as to require partial but not full opening of the pressure relief valve M, the pilot disc 17 is rotated to such position that the port 45 thereof only partially registers with the port e in the seat 18, whereby to only partially relieve the pressure in the main diaphragm chamber 13 through the valve E. In this manner, the pressure relief valve M is controlled to open only to the extent necessary to relieve the then existing excess pressure condition in the pipe line X. As the excess line pressure is relieved by flow through the valve M, the pressure in the inlet chamber 4 of the valve M will be gradually reduced with a corresponding reduction occurring in the pilot diaphragm chamber 38 so that the spring 31 will force the spent operating fluid out of said pilot diaphragm chamber into conduit 40, and shift the rod 27 toward the left, as viewed in Fig. 2, to return the pilot disc 17 to its initial inactive position shown in Figs. 1 and 8. When returned to this position it will be apparent that operating fluid under pressure can simultaneously flow from the pressure chamber 16 of the pilot valve P to the diaphragm chamber 13 in the relief valve M and to the pressure chamber 13' in the auxiliary exhaust control valve E to effect closing of both valves. Inasmuch as the capacity of the chamber 13' is much less than that of the chamber 13, the auxiliary exhaust control valve E will close first and prevent flow of operating fluid from the main diaphragm chamber 13 through the conduit 69. However, operating fluid under pressure will continue to flow exclusively through the pilot valve P and the conduit 50 at the rate permitted by the needle valve 52 so that the main valve M will close at a relatively slow, governed rate until it is closed drip-tight.

It will be apparent from the foregoing that the pressure relief valve M and the control means provided therefor in the form of the small pilot valve P, the pressure responsive device Y, and the auxiliary exhaust control valve E is such that said relief valve can open extremely rapidly (to its full extent, if necessary) to relieve any sudden surges in the pipe line X but that its closing movement must always occur at a relatively slower, controlled rate so that it cannot chatter or slam closed suddenly and produce shocks in the pipe line X.

Figure 11:
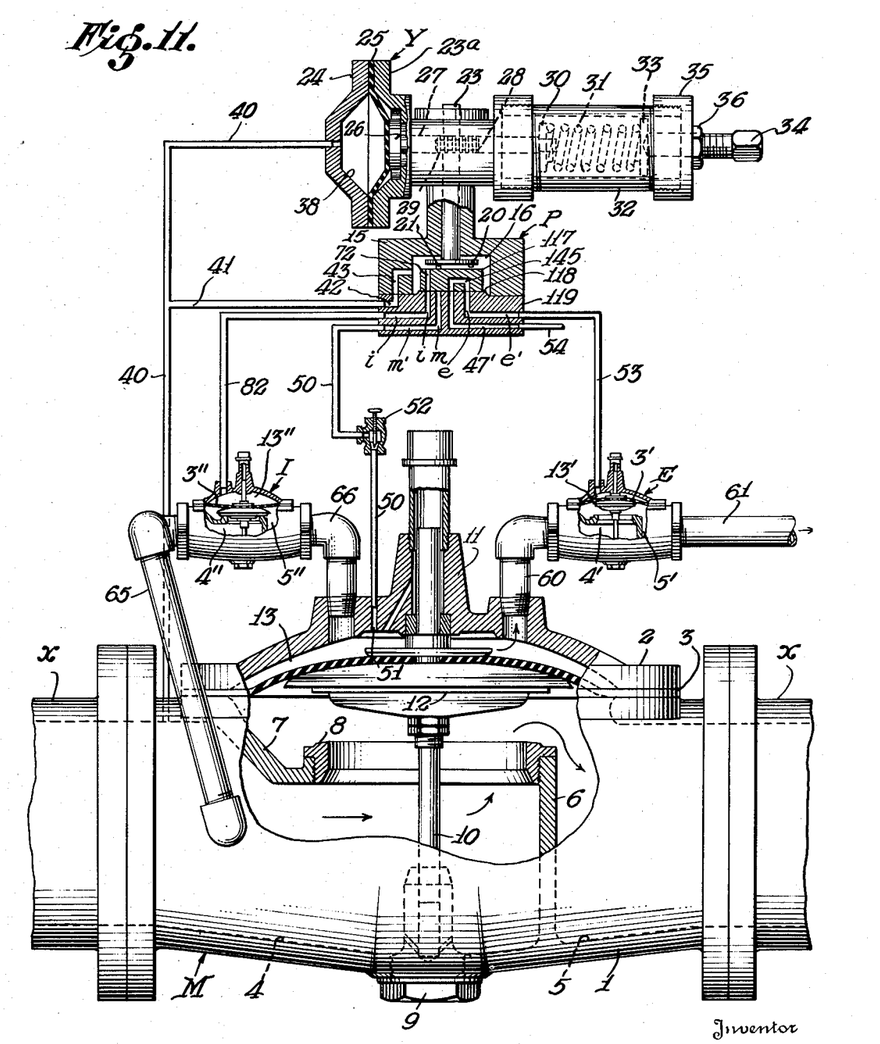
Fig. 11 is a diagrammatic view of a main diaphragm valve and a modified form of control means including a pilot valve (drawn to an exaggerated scale) and two auxiliary control valves interconnected so as to effect automatic quick opening, quick partial closing, and final slow closing of said main valve at a much slower rate of speed, the parts of the various valves being shown in the position they assume when the main valve is wide open to relieve an excess pressure condition.
Figure 12:
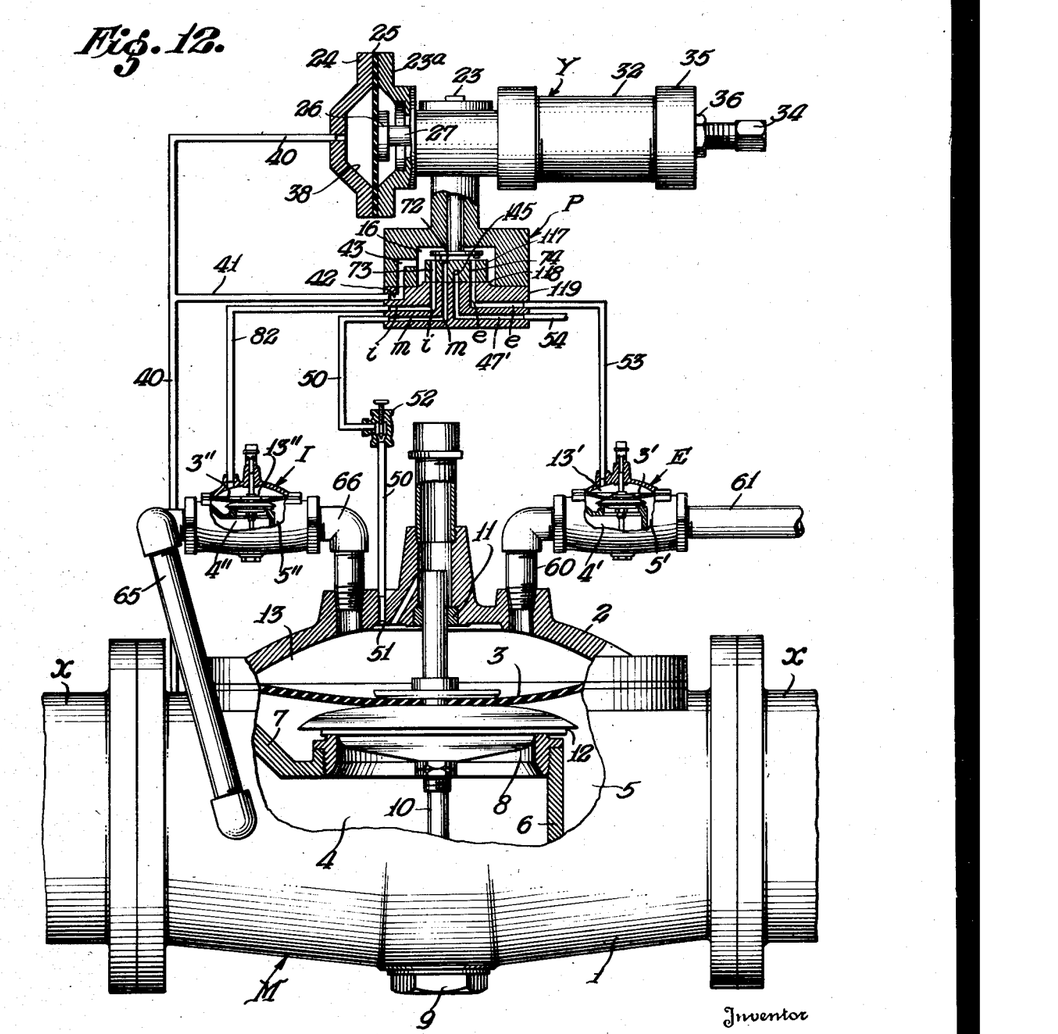
Fig. 12 is a view similar to Fig. 11 illustrating the various parts of the main valve, the automatic pilot valve, and auxiliary inlet and exhaust control valves in the position that they assume during normal operation when no excess pressure condition exists on the inlet side of the main valve.
Figure 13:
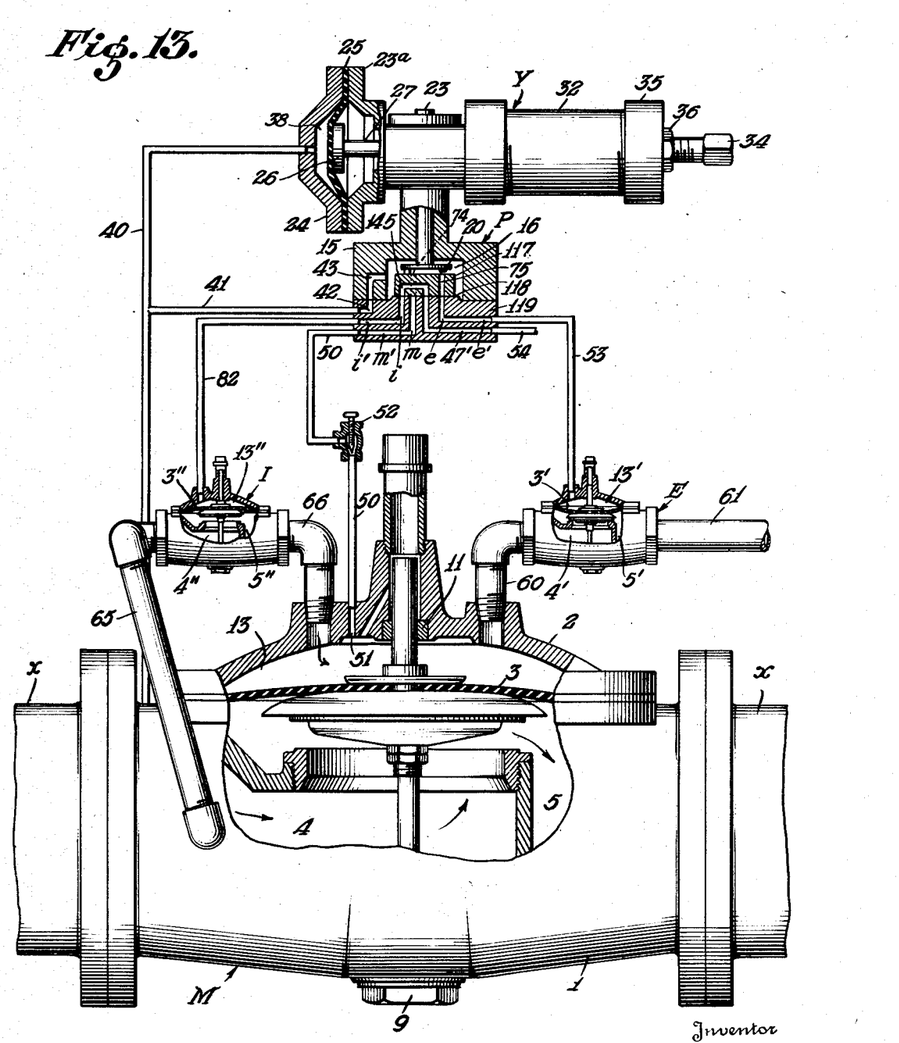
Fig. 13 is a view similar to Fig. 11 but illustrating the parts of the main valve and the control means in the position that they assume to effect quick, partial closing of said main valve.

Figures 11, 12 and 13 illustrate a valve control means generally similar to that described hereinabove, but modified to include an auxiliary inlet control valve for effecting a partial rapid closing of the pressure relief valve to avoid an undesirable pressure drop in the pipe line. For convenience, the parts corresponding to those already described are identified by the same reference numerals. However, the porting in the pilot disc, seat, and the fluid distribution base is slightly different from that employed in the control means shown in Figures 1 and 2 and these parts will therefore be described in detail hereinafter.

The auxiliary inlet control valve is generally identified by the letter I and may be identical with the auxiliary exhaust control valve E. The parts of valve I corresponding to those of the valve E have been identified by the same numeral, but include the exponent double prime (") to distinguish the same.

It will be noted from Figure 11 that the auxiliary inlet control valve I has the inlet chamber 4" thereof connected with the chamber 4 of the main valve M by a conduit 65. It will be further noted that the outlet chamber 5" of the valve I is connected by a conduit 66 with the diaphragm pressure chamber 13 of the main valve M.

Figures 14, 19, 20, 21:
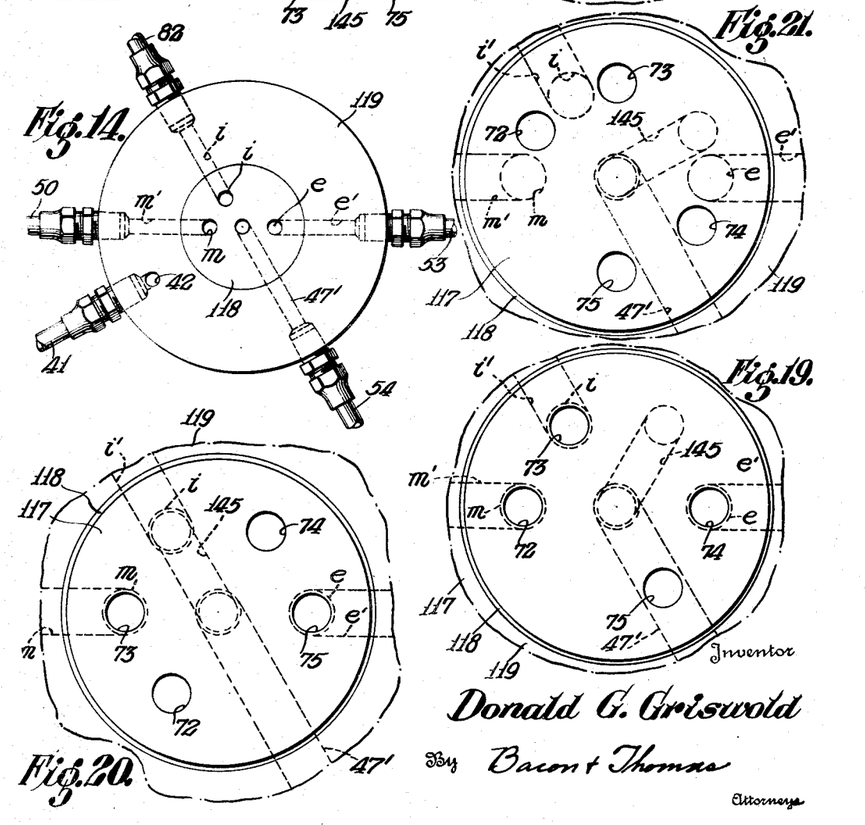
Fig. 14 is a plan view of the pilot seat and fluid distribution base of the pilot valve shown in Figs. 11 to 13.
Fig. 19 shows the position of the pilot disc relative to its seat during the slow closing period of the main valve, which also corresponds to the position of the pilot disc when the main valve is in the closed position shown in Fig. 12.
Fig. 20 is a view similar to Fig. 18 but illustrates the pilot disc in the position it assumes relative to its seat corresponding to the quick, partial closing position of the main valve shown in Fig; 13.
Fig. 21 is a diagrammatic view showing the relative position of the pilot disc with respect to its seat corresponding to an intermediate or neutral position of the pilot disc.
Figures 15, 16, 17, 18:
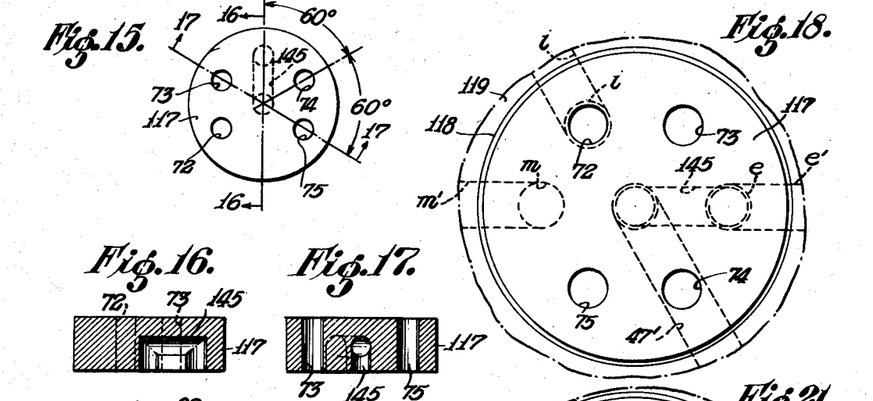
Fig. 15 is a plan view of the pilot disc employed in the pilot valve shown in Figs. 11 to 13.
Fig. 16 is a sectional view through the exhaust port of the pilot disc taken on the line 16—16 of Fig. 15.
Fig. 17 is a sectional view through two of the pressure ports and the exhaust port of the pilot disc taken on the line 17—17 of Figure 15.
Fig. 18 is a diagrammatic view illustrating the relative position of the ports in the pilot disc and seat corresponding to the open position of the main valve shown in Fig. 11.

The details of the modified pilot disc are shown in Figures 15 to 17 and the details of the modified seat and fluid distribution base are shown in Figure 14. Upon comparison of Figure 15 with Figure 5 it will be noted that the modified pilot disc 117 includes the same general U-shaped exhaust port 145, but instead of having two through or pressure ports it has four pressure ports 72, 73, 74 and 75, respectively, all of said ports being disposed upon radii spaced 60° apart with two pressure ports arranged upon each side of said exhaust port. The modified pilot disc seat 118 (Fig. 14), which may (but need not) be formed integral with a fluid distribution base 119 is provided with a port i and passage i' in addition to the previously described ports e, m, passage 47', etc. A conduit 82 is connected at one end with the outlet of the passage i' and at its opposite end (Fig. 11) with the diaphragm pressure chamber 13" in the auxiliary inlet control valve I.

The pilot disc 117 is adapted to be rotated through an angle of 120 degrees for a full cycle of operation, whereas the pilot disc 17 only turns through a cycle angle of about 60 degrees. By way of further comparison, the pilot disc 117 has 3 operative positions, as compared with the 2 operative positions of the pilot disc 17. Thus, Fig. 18 corresponds to one extreme position of the pilot disc 117 wherein the relief valve M is permitted to quickly open to relieve excess pressure in the pipe line X; Figure 19 corresponds to the normal operating or intermediate position of the pilot disc 117 wherein the main valve M is maintained closed so long as no excessive pressure condition exists in the pipe line X on the inlet side of said main valve; and Figure 20 corresponds to the other extreme position of the pilot disc 117 wherein quick partial closing of the relief valve M is obtained.

Referring now to Figures 12 and 19, it will be noted that the ports 72, 73 and 74 of the pilot disc 117 are respectively in registration with the ports m, i and e in the seat 118 so that operating fluid under pressure is effective upon the diaphragms 3, 3' and 3" of the main valve M, the auxiliary exhaust control valve E, and the auxiliary inlet control valve I, respectively, to maintain all of these valves closed drip-tight.

So long as the pilot disc 117 assumes the intermediate position shown in Figure 19, fluid pressure from the pressure chamber 16 of the pilot valve E will be effective on the diaphragm 3 of the main valve M through the port 72 in the pilot disc 117, the port m and passageway m' in the base 119, and conduit 50. Similarly, fluid pressure will be effective upon the diaphragm 3' of the auxiliary exhaust control valve E through the port 74 in the pilot disc 117, port e and passageway e' in the base 119, and conduit 53. Furthermore, fluid pressure will be effective upon the diaphragm 3" of the auxiliary inlet control valve I through the port 73 in the pilot disc 117, the port i and passageway i' in the base 119, and conduit 82.

Assuming now that a substantial sudden surge or excess pressure condition arises in the pipe line X, the pilot diaphragm 25 will be flexed toward the right, causing the rod 27 to be shifted in the same direction to effect clockwise rotation of the pilot disc 117 through an angle of about 60 degrees. The pilot disc 117 will then assume the position relative to its seat 118 diagrammatically illustrated in Figures 11 and 18. When in this position, the port 72 in the pilot disc 117 will register with the port i in the seat 118 and the fluid pressure will be maintained on the diaphragm 3" of the auxiliary inlet control valve I in the manner described above to maintain the valve I closed. At the same time, the U-shaped exhaust port 145 of the pilot disc 117 registers with the port e in the seat 118 to effect the exhaust of spent operating fluid from the diaphragm chamber 13' of the auxiliary exhaust control valve E, whereby to permit opening of said valve and rapid draining of operating fluid from the chamber 13 of the relief valve M to enable said relief valve to open quickly to relieve the excess pressure. The valve M will open quickly and remain open to the extent necessary to relieve the excess pressure, and if no great pressure drop in the pipe line X has been occasioned by the opening of the valve M, the pilot disc 117 will slowly return to its intermediate position shown in Figures 12 and 20 as the pressure in the line X builds up to normal to effect closing of the auxiliary exhaust control valve E and the main valve M, in the manner previously described in connection with Figures 1 and 2. However, if the opening of the main valve M has resulted in a substantial and undesirable pressure drop in the pipe line X, the spring 31 will shift the rod 27 to the extreme left and the pilot disc 117 will be rotated counterclockwise from the position shown in Figures 11 and 18 to that shown in Figures 13 and 20.

It will be noted that when the pilot disc 117 assumes the position shown in Figures 13 and 20, the port 75 in the pilot disc 117 registers with the port e in the seat 118 to effect closing of the auxiliary exhaust control valve E, in the manner previously described in discussing the operation of the valve control means shown in Figures 1 and 2. At the same time, the exhaust port 145 of the pilot disc 117 registers with the port i in the seat 118 to effect draining of spent operating fluid from the diaphragm chamber 13″ of the auxiliary inlet control valve I to permit said valve to open and allow operating fluid under pressure to rapidly flow from inlet chamber 4 through the conduits 65 and 66 into the diaphragm chamber 13 of the main or relief valve M to effect a quick, partial closing of said main valve. At this time, the port 73 in the pilot disc 117 registers with the port m so that operating fluid under pressure is also introduced into the diaphragm chamber 13 through the conduit 50 to aid in effecting the rapid, partial closing of the valve M. During the closing of the main valve M, the resistance to flow through said valve increases as the disc 12 approaches the seat 8 so that a back pressure is gradually built up in the pipe line X and is transmitted to the pilot diaphragm chamber 38 through the conduit 40. When this back pressure reaches a given magnitude the pilot diaphragm 25 is flexed toward the right sufficiently to cause the pilot disc 117 to assume its intermediate position shown in Figures 12 and 19. The exhaust port 145 no longer registers with the port i, but instead port 73 now registers with the port i and operating fluid under pressure is admitted into the diaphragm chamber 13″ to effect closing of the auxiliary inlet control valve I. Simultaneously, fluid under pressure is admitted through port 72 into the diaphragm chamber 13 of the main valve M. In view of the difference in the volume of the diaphragm chambers 13″ and 13, the auxiliary inlet control valve I will be completely closed while the valve M is still partially open. Hence, the further and final closing movement of the valve M will occur at a much slower rate in view of the relatively smaller flow of operating fluid under pressure through the port 72 and the conduit 50, and any restriction to such flow offered by the adjustable needle valve 52.

At certain times the pressure condition in the pipe line X may be such that the pilot disc will assume a neutral position relative to its seat, as illustrated, for example, in Figure 21. It will be noted from this figure that none of the ports in the pilot disc 117 registers with any of the ports in the pilot disc seat 118 so that no flow of operating fluid from the pilot valve P to any one of the valves M, E, or I occurs. Such condition usually corresponds to one wherein the main valve M is partially open or is modulating.

It will be apparent from the foregoing that the pressure relief valve M and the control means therefor shown in Figures 11 to 21 provide means by which said relief valve can be quickly opened to relieve a sudden surge or excess pressure condition in a pipe line and to thereafter quickly close to prevent an excessive pressure drop in said pipe line, the valve partially closing quickly to prevent such loss of pressure and then continuing its closing movement at a relatively slower, controlled rate to prevent slamming and line shock.

While certain sizes of valves have been specified herein as illustrative examples, it will be understood that the same small pilot valve P can be used with main valves of various sizes, including 12 inch valves and larger valves, and that the auxiliary control valves E and I can be of a suitable size and capacity to effect the desired quick opening and/or partial quick closing of any given main valve.

It will also be understood that the pressure relief valve disclosed herein and the pilot control means associated therewith may be used for various purposes other than that specifically described herein, and particularly in the control of gaseous fluids as well as liquids.

It will be further understood that various changes may be made in the construction and arrangement of the pressure responsive pilot mechanism, the auxiliary control valves and in the main relief valve without departing from the spirit of the invention or the scope of the annexed claims.

I claim:

1. Means for controlling flow in a pipeline, comprising: a valve adapted to be connected in said pipeline for controlling flow therethrough; and means for controlling the operation of said valve including means operable under the direct control of said control means for effecting quick, partial closing of said valve, and means other than said quick-closing means also under the direct control of said control means for effecting further closing of said valve at a substantially uniform, relatively much slower rate through the remainder of its closing movement.

2. Means for controlling flow in a pipeline, comprising: a valve adapted to be connected in said pipeline for controlling flow therethrough; and means for controlling the operation of said valve including means operable under the direct control of said control means for effecting quick opening of said valve to its full extent, if necessary, means operable under the direct control of said control means for effecting quick partial closing of said valve, and means other than said quick-opening and quick-closing means and also under the direct control of said control means for effecting further closing of said valve at a gradual, relatively slow rate.

3. Means for relieving excess pressure in a pipeline, comprising: a relief valve adapted to be connected in said pipeline to relieve excess pressure therein by opening and permitting flow through said pipeline; and automatic means for controlling the operation of said relief valve in accordance with pressure variations in said pipeline on the inlet side of said relief valve and including means under the direct control of said control means for effecting quick, partial closing of said relief valve after the excess pressure has been relieved and other means also under the direct control of said control means for effecting all further closing of said relief valve at a relatively much slower governed rate to prevent said relief valve from slamming shut and causing line shock.

4. Means for relieving excess pressure in a pipeline, comprising: a relief valve adapted to be connected in said pipeline for controlling the flow of fluid therethrough; and automatic means including a pressure responsive device for controlling the operation of said relief valve in accordance with pressure variations in said pipeline on the inlet side of said relief valve and including means controlled by said pressure responsive device for effecting quick opening of said relief valve to relieve excess pressure in said pipeline, means controlled by said pressure responsive device for effecting quick, partial closing of said relief valve to avoid an undesirable pressure drop in said pipeline, and other means also controlled by said pressure responsive device for effecting further closing of said relief valve at a relatively slow rate to prevent said relief valve from slamming shut and causing line shock.

5. Means for relieving excess pressure in a pipeline, comprising: a fluid pressure operable relief valve adapted to be connected in said pipeline; and automatic control means for controlling said relief valve including a pilot valve, means responsive to pressure variations in said pipeline on the inlet side of said relief valve for controlling the operation of said pilot valve, and an auxiliary exhaust control valve controlled by said pilot valve, said pressure-responsive means, pilot valve, relief valve, and auxiliary exhaust control valve being so constructed and interconnected that said pilot valve is actuated by said pressure-responsive means when an excess pressure condition exists in said pipeline to effect opening of said auxiliary exhaust control valve to permit the exhaust of spent operating fluid from said relief valve through said auxiliary exhaust control valve so that said relief valve can open quickly to relieve the excess pressure in said pipeline, and said pilot valve is actuated by said pressure-responsive means to effect closing of said auxiliary exhaust control valve and relatively slow closing of said relief valve by operating fluid passing only through said pilot valve.

6. Means for relieving excess pressure in a pipeline, comprising: a fluid pressure operable relief valve adapted to be connected in said pipeline; and automatic control means for said relief valve including a pilot valve, means responsive to pressure variations in said pipeline on the inlet side of said relief valve for controlling the operation of said pilot valve, and an auxiliary inlet control valve controlled by said pilot valve, said pressure-responsive means, pilot valve, relief valve, and auxiliary inlet control valve being so constructed and interconnected that said pilot valve is actuated by said pressure-responsive means to effect opening of said auxiliary inlet control valve to supply operating fluid to said relief valve to effect quick, partial closing of said relief valve, whereby to avoid an excess drop in line pressure and to build up a back pressure in said pipeline, and said pilot valve is actuated by said pressure-responsive means when substantially the normal pressure has been restored in said pipeline to effect closing of said auxiliary inlet control valve and final relatively slow closing movement of said main valve by operating fluid passing only through said pilot valve.

7. Means for relieving excess pressure in a pipeline, comprising: a fluid pressure operable relief valve adapted to be connected in said pipeline; and automatic control means for said relief valve including a pilot valve, means responsive to pressure variations in said pipeline on the inlet side of said relief valve for controlling the operation of said pilot valve, and auxiliary exhaust and inlet control valves, respectively, controlled by said pilot valve, said pressure-responsive means, pilot valve, relief valve, and auxiliary control valves being constructed and interconnected so that, first, said pilot valve is actuated by said pressure-responsive means when an excess pressure condition exists in said pipeline to effect opening of said auxiliary exhaust control valve to permit the exhaust of spent operating fluid from said relief valve through said auxiliary exhaust control valve so that said relief valve can open quickly to relieve the excess pressure in said pipeline, secondly, said pilot valve is actuated by said pressure-responsive means upon a substantial pressure drop in said pipeline to effect closing of said auxiliary exhaust control valve and the opening of said auxiliary inlet control valve to rapidly supply operating fluid under pressure to said relief valve to effect quick, partial closing of said relief valve, whereby to avoid an excess drop in line pressure and to build up a back pressure in said pipeline, and, thirdly, said pilot valve is actuated by said pressure-responsive means when substantially the normal pressure has been restored in said pipeline to effect closing of said auxiliary inlet control valve and final closing movement of said relief valve by operating fluid passing only through said pilot valve to effect closing of said relief valve at a relatively slow rate.

8. Means for controlling flow through a pipeline, comprising: a main valve adapted to be connected in said pipeline having a body provided with inlet and outlet chambers, and means including a pressure chamber for controlling the flow through said body; a fluid pressure operable auxiliary exhaust control valve for exclusively exhausting spent operating fluid at a rapid rate from said pressure chamber, said auxiliary exhaust control valve having inlet and outlet chambers; an exhaust conduit establishing communication between said pressure chamber of said main valve and the inlet chamber of said auxiliary exhaust control valve; and a pilot valve arranged to admit operating fluid under pressure into said pressure chamber of said main valve at a relatively slow rate and to control the supply and exhaust of operating fluid to and from said pressure fluid operable auxiliary exhaust control valve, said auxiliary exhaust control valve having a flow capacity greatly in excess of that of said pilot valve, whereby said main valve opens at a much faster rate than it is closed by operating fluid flowing to said pressure chamber of said main valve through said pilot valve.

9. Means for relieving excess pressure in a pipeline, comprising: a main valve adapted to be connected in said pipeline having a body provided with inlet and outlet chambers, and means including a pressure chamber for controlling the flow through said body; a fluid pressure operable auxiliary exhaust control valve for exclusively exhausting spent operating fluid at a rapid rate from said pressure chamber, said auxiliary exhaust control valve having inlet and outlet chambers; an exhaust conduit establishing communication between said pressure chamber of said main valve and the inlet chamber of said auxiliary exhaust control valve; and a pilot valve arranged to exclusively admit operating fluid under pressure into said pressure chamber of said main valve at a relatively slow rate and to control the supply and exhaust of operating fluid to and from said pressure fluid operable auxiliary exhaust control valve, said auxiliary exhaust control valve having a flow capacity greatly in excess of that of said pilot valve, whereby said main valve opens at a much faster rate than it is closed by operating fluid flowing to said pressure chamber through said pilot valve; and means responsive to variations in pressure on the inlet side of said main valve for actuating said pilot valve.

10. Means for controlling flow through a pipeline, comprising: a main valve adapted to be connected in said pipeline having a body provided with inlet and outlet chambers, and means including a pressure chamber for controlling the flow through said body; a pressure fluid operable auxiliary inlet control valve for admitting operating fluid at a rapid rate into said pressure chamber, said auxiliary inlet control valve also having inlet and outlet chambers; conduit means for supplying operating fluid under pressure to the inlet chamber of said auxiliary inlet control valve and other conduit means establishing communication between the outlet chamber of said auxiliary inlet control valve and said pressure chamber of said main valve; a fluid pressure operable auxiliary exhaust control valve for exhausting spent operating fluid at a rapid rate from said pressure chamber, said auxiliary exhaust control valve having inlet and outlet chambers; an exhaust conduit establishing communication between said pressure chamber of said main valve and the inlet chamber of said auxiliary exhaust control valve; and a pilot valve arranged to directly admit operating fluid under pressure into the pressure chamber of said main valve at a relatively slow rate and to control the supply and exhaust of operating fluid to and from said pressure fluid operable auxiliary inlet and exhaust control valves, respectively.

11. Means for relieving excess pressure in a pipeline, comprising: a relief valve adapted to be connected in said pipeline having a body provided with inlet and outlet chambers, and means including a pressure chamber for controlling the flow through said body; a pressure fluid operable auxiliary inlet control valve for admitting operating fluid at a rapid rate into said pressure chamber, said auxiliary inlet control valve also having inlet and outlet chambers; conduit means for supplying operating fluid under pressure to the inlet chamber of said auxiliary inlet control valve and other conduit means establishing communication between the outlet chamber of said auxiliary inlet control valve and said pressure chamber of said relief valve; a fluid pressure operable auxiliary exhaust control valve for exhausting spent operating fluid at a rapid rate from said pressure chamber, said auxiliary exhaust control valve having inlet and outlet chambers; an exhaust conduit establishing communication between said pressure chamber of said relief valve and the inlet chamber of said auxiliary exhaust control valve; a pilot valve arranged to directly admit operating fluid under pressure into the pressure chamber of said relief valve at a relatively slow rate and to control the supply and exhaust of operating fluid to and from said pressure fluid operable auxiliary inlet and exhaust control valves, respectively; and means responsive to variations in pressure on the inlet side of said relief valve for actuating said pilot valve.

12. Means for relieving excess pressure in a pipeline, comprising: a relief valve adapted to be connected in said pipeline having a body provided with inlet and outlet chambers, a cover, and a diaphragm for controlling the flow through said body, said cover and diaphragm being arranged to provide a diaphragm pressure chamber for operating fluid under pressure; a pressure fluid operable auxiliary inlet control valve for admitting operating fluid at a rapid rate into said diaphragm pressure chamber, said auxiliary inlet control valve also having inlet and outlet chambers; conduit means establishing communication between the inlet chamber of said auxiliary inlet control valve and said inlet chamber of said relief valve and other conduit means establishing communication between the outlet chamber of said auxiliary inlet control valve and said diaphragm pressure chamber of said relief valve; a fluid pressure operable auxiliary exhaust control valve for exhausting operating fluid at a rapid rate from said diaphragm pressure chamber, said auxiliary exhaust control valve having inlet and outlet chambers; a conduit establishing communication between said diaphragm pressure chamber and the inlet chamber of said auxiliary exhaust control valve; a pilot valve arranged to directly admit operating fluid under pressure into the diaphragm pressure chamber of said relief valve at a relatively slow rate and to control the supply and exhaust of operating fluid to and from said pressure fluid operable auxiliary inlet and exhaust control valves, respectively; and means responsive to variations in pressure on the inlet side of said main valve for actuating said pilot valve.

13. Means for relieving excess pressure in a pipeline comprising: a relief valve of the diaphragm type adapted to be connected in said pipeline; a pilot valve for controlling said relief valve, said pilot valve including a chamber for operating fluid under pressure and having a ported pilot element in said pressure chamber; means for supplying operating fluid under pressure to said pressure chamber of said pilot valve; pressure-responsive means for actuating said pilot element of said pilot valve in accordance with pressure changes in said pipeline on the inlet side of said relief valve; a conduit establishing communication between said pilot valve and the diaphragm chamber of said relief valve for conducting operating fluid under pressure from said pilot valve to said diaphragm chamber; a relatively small auxiliary exhaust control valve of the diaphragm type having a flow capacity much less than that of said relief valve but greatly in excess of that of the ports of said pilot element; a conduit establishing communication between the diaphragm chamber of said relief valve and the inlet of said auxiliary exhaust control valve; and a conduit establishing communication between said pilot valve and the diaphragm chamber of said auxiliary exhaust control valve, said pilot element having at least two predetermined operative positions: one in which said pilot element is positioned to simultaneously admit operating fluid under pressure into the diaphragm chamber of said relief valve and into the diaphragm chamber of said relatively small auxiliary exhaust control valve to close said auxiliary exhaust control valve prior to closing of said relief valve, and another position in which said pilot element obstructs communication between the pressure chamber of said pilot valve and the diaphragm chamber of said relief valve so that no fluid under pressure can enter said last-mentioned diaphragm chamber and spent operating fluid is exhausted from the diaphragm chamber of said auxiliary exhaust control valve to effect opening of said auxiliary exhaust control valve to rapidly exhaust spent operating fluid from the diaphragm chamber of said relief valve to permit quick opening of said relief valve.

14. Means for relieving excess pressure in a pipeline comprising: a relief valve of the diaphragm type adapted to be connected in said pipeline; a pilot valve for controlling said relief valve, said pilot valve including a chamber for operating fluid under pressure and having a ported pilot element in said pressure chamber; means for supplying operating fluid under pressure to said pressure chamber of said pilot valve; pressure-responsive means for actuating said pilot element of said pilot valve in accordance with pressure changes in said pipeline on the inlet side of said relief valve; a conduit establishing communication between said pilot valve and the diaphragm chamber of said relief valve for conducting operating fluid under pressure from said pilot valve to said diaphragm chamber; an auxiliary exhaust control valve of the diaphragm type having a flow capacity greatly in excess of that of said pilot valve; a conduit establishing communication between the diaphragm chamber of said relief valve and the inlet of said auxiliary exhaust control valve; a conduit establishing communication between said pilot valve and the diaphragm chamber of said auxiliary exhaust control valve; an auxiliary inlet control valve of the diaphragm type having a flow capacity greatly in excess of that of said pilot valve; means for supplying operating fluid under pressure to the inlet of said auxilary inlet control valve; a conduit establishing communication between the outlet of said auxiliary inlet control valve and the diaphragm chamber of said relief valve; and a conduit establishing communication between said pilot valve and the diaphragm chamber of said auxiliary inlet control valve, said pilot element having three operative positions: one in which said ported pilot element is positioned to admit operating fluid under pressure into the diaphragm chamber of said relief valve while maintaining said auxiliary exhaust and inlet control valves closed; a second position in which spent operating fluid is exhausted from the diaphragm chamber of said auxiliary exhaust control valve to effect opening of said auxiliary exhaust control valve to quickly exhaust spent operating fluid from the diaphragm chamber of said relief valve to permit quick opening of said relief valve while maintaining said auxiliary inlet control valve closed; and a third position in which spent operating fluid is exhausted from the diaphragm chamber of said auxiliary inlet control valve to permit opening of said auxiliary inlet control valve and the rapid flow of operating fluid under pressure therethrough into the diaphragm chamber of said relief valve to effect a quick, partial closing of said relief valve while maintaining said auxiliary exhaust control valve closed.

15. Means for relieving excess pressure in a pipeline comprising: a relief valve of the diaphragm type adapted to be connected in said pipeline; a pilot valve for controlling said relief valve, said pilot valve including a chamber for operating fluid under pressure and having a rotatable ported pilot disc in said pressure chamber; means for supplying operating fluid under pressure to said pressure chamber of said pilot valve; a device including pressure responsive means for effecting rotation of said pilot disc in accordance with pressure changes in said pipeline on the inlet side of said relief valve; a first conduit establishing communication between said pilot valve and the diaphragm chamber of said relief valve for conducting operating fluid under pressure from said pilot valve to said diaphragm chamber; a relatively small auxiliary exhaust control valve of the diaphragm type having a flow capacity much less than that of said relief valve, but greatly in excess of that of the ports of said rotatable pilot disc; a second conduit establishing communication between the diaphragm chamber of said relief valve and the inlet of said auxiliary exhaust control valve; and a third conduit establishing communication between said pilot valve and the diaphragm chamber of said auxiliary exhaust control valve, said rotatable pilot disc having at least two predetermined operative positions: one in which a pair of pressure ports of said rotatable pilot disc are positioned to simultaneously admit operating fluid under pressure through said first and third conduits into the diaphragm chamber of said relief valve and into the diaphragm chamber of said auxiliary exhaust control valve to close said auxiliary exhaust control valve prior to closing of said relief valve, and another position in which said rotatable pilot disc obstructs communication between the pressure chamber of said pilot valve and said first conduit so that no fluid under pressure can enter the diaphragm chamber of said relief valve and an exhaust port in said pilot disc is positioned so that spent operating fluid is exhausted from the diaphragm chamber of said auxiliary control valve through said third conduit and said pilot valve to effect opening of said auxiliary exhaust control valve and thus rapidly exhausting spent operating fluid from the diaphragm chamber of said relief valve through said second conduit and said auxiliary exhaust control valve to permit quick opening of said relief valve.

16. In combination, a fluid pressure operable main valve including a pressure chamber for operating fluid; an operating-fluid exhaust valve connected in communicating relation with said pressure chamber to exhaust spent operating fluid from said pressure chamber at a rapid rate to permit quick opening of said main valve; and automatic pressure responsive means controlling the operation of said main valve in accordance with variations in line pressure on the inlet side of said main valve and arranged to control both the opening and closing of said exhaust valve, and also arranged to continue the admission of operating fluid into said pressure chamber of said main valve after closing of said exhaust valve to effect closing of said main valve at a slow rate.

17. A fluid pressure operable main valve adapted to be connected in a pipe line, said main valve including a pressure chamber for operating fluid; an exhaust valve connected in communicating relation with said pressure chamber for exhausting spent operating fluid from said pressure chamber at a rapid rate to allow quick opening of said main valve; an inlet valve in communicating relation with said pressure chamber for admitting operating fluid under pressure at a rapid rate into said pressure chamber to effect quick partial closing of said main valve; and automatic means controlling the operation of said main valve including a pressure responsive pilot valve controlling said inlet and exhaust valves, said pilot valve being arranged to continue the supply of operating fluid to said pressure chamber at a relatively slow rate after closing of said inlet valve so that said main valve will thereafter continue to close at a correspondingly slow rate.

18. The combination defined in claim 16 including, an operating-fluid admission valve connected in communicating relation with the pressure chamber of the main valve to admit operating fluid into said chamber at a rapid rate to effect quick partial closing of said main valve, and in which the automatic control means is also arranged to allow opening and to control closing of said operating-fluid admission valve in the event of an excessive drop in line pressure following the opening of said main valve and to continue the admission of operating fluid into said pressure chamber of said main valve after closing of said operating-fluid admission valve to effect further closing of said main valve at a relatively slow rate.

DONALD G. GRISWOLD.

REFERENCES CITED

The following references are of record in the file of this patent:

UNITED STATES PATENTS

| Number | Name | Date |
|---|---|---|
| 143,920 | Mayer | Oct. 21, 1873 |
| 703,687 | Warren | July 1, 1902 |
| 1,398,151 | Ralston | Nov. 22, 1921 |
| 1,611,079 | Roschanek | Dec. 14, 1926 |
| 1,800,608 | Dobrick | Apr. 14, 1931 |
| 1,828,517 | White | Oct. 20, 1931 |
| 1,985,257 | Kocour | Dec. 25, 1934 |
| 2,239,148 | Ernst | Apr. 22, 1941 |
| 2,328,007 | Griswold | Aug. 31, 1943 |
| 2,368,981 | Griswold | Feb. 6, 1945 |
| 2,377,227 | Griswold | May 29, 1945 |

FOREIGN PATENTS

| Number | Country | Date |
|---|---|---|
| 229,147 | Great Britain | Feb. 19, 1925 |
| 258,163 | Great Britain | Sept. 16, 1926 |